US 11,969,654 B2

(12) United States Patent
Wan et al.

(10) Patent No.: US 11,969,654 B2
(45) Date of Patent: Apr. 30, 2024

(54) METHOD AND APPARATUS FOR DETERMINING TARGET VIRTUAL OBJECT, TERMINAL, AND STORAGE MEDIUM

(71) Applicant: TENCENT TECHNOLOGY (SHENZHEN) COMPANY LIMITED, Guangdong (CN)

(72) Inventors: Yulin Wan, Guangdong (CN); Shandong Su, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 292 days.

(21) Appl. No.: 17/501,976

(22) Filed: Oct. 14, 2021

(65) Prior Publication Data
US 2022/0032195 A1 Feb. 3, 2022

Related U.S. Application Data

(63) Continuation of application No. PCT/CN2021/094477, filed on May 19, 2021.

(30) Foreign Application Priority Data

Jun. 5, 2020 (CN) .......................... 202010507449.2

(51) Int. Cl.
*A63F 13/58* (2014.01)
*A63F 13/56* (2014.01)

(52) U.S. Cl.
CPC .............. *A63F 13/58* (2014.09); *A63F 13/56* (2014.09); *A63F 2300/65* (2013.01)

(58) Field of Classification Search
CPC ........ A63F 13/537; A63F 13/52; A63F 13/56; A63F 13/58
See application file for complete search history.

(56) References Cited

U.S. PATENT DOCUMENTS

| 5,415,549 A | * | 5/1995 | Logg ................... A63F 13/5255 |
| | | | 434/33 |
| 2002/0103031 A1 | * | 8/2002 | Neveu .................. A63F 13/537 |
| | | | 463/49 |

(Continued)

FOREIGN PATENT DOCUMENTS

| CN | 105194873 A | 12/2015 |
| CN | 105335065 A | 2/2016 |

(Continued)

OTHER PUBLICATIONS

International Search Report and Written Opinion Issued in Application PCT/CN2021/094477 dated Aug. 20, 2021, (11 pages).

(Continued)

*Primary Examiner* — Steve Rowland
(74) *Attorney, Agent, or Firm* — ARENTFOX SCHIFF LLP

(57) ABSTRACT

A method for determining a target virtual object is provided. In the method, a target search range corresponding to a target skill of a controlled virtual object is determined in response to a trigger operation of the target skill. The virtual object is controlled by a user. In response to the target search range including a plurality of first virtual objects in the target search range, at least one second virtual object that satisfies a defeated condition is obtained from the plurality of first virtual objects, the defeated condition indicating that a preset threshold of virtual health points will be reached after the target skill is performed on the first virtual object. A third virtual object that satisfies a target hit condition of the user is obtained from the at least one second virtual object. The target skill is performed on the third virtual object as the target virtual object.

20 Claims, 9 Drawing Sheets

(56) References Cited

U.S. PATENT DOCUMENTS

| | | | |
|---|---|---|---|
| 2004/0157662 A1* | 8/2004 | Tsuchiya | A63F 13/5378 463/32 |
| 2006/0287027 A1* | 12/2006 | Hardisty | A63F 13/45 463/8 |
| 2007/0270215 A1* | 11/2007 | Miyamoto | A63F 13/45 463/32 |
| 2008/0214304 A1* | 9/2008 | Castle | A63F 13/10 463/36 |
| 2009/0181736 A1* | 7/2009 | Haigh-Hutchinson | A63F 13/55 463/2 |
| 2009/0241038 A1 | 9/2009 | Izuno et al. | |
| 2009/0325660 A1* | 12/2009 | Langridge | A63F 13/45 463/2 |
| 2010/0273544 A1 | 10/2010 | Koganezawa et al. | |
| 2010/0311503 A1* | 12/2010 | McMain | A63F 13/537 463/40 |
| 2012/0322523 A1* | 12/2012 | Woodard | A63F 13/69 463/2 |
| 2013/0196767 A1* | 8/2013 | Garvin | A63F 13/422 463/36 |
| 2015/0157940 A1* | 6/2015 | Hall | A63F 13/5372 463/31 |
| 2015/0258439 A1* | 9/2015 | Prosin | A63F 13/00 463/31 |
| 2015/0273331 A1* | 10/2015 | McMain | A63F 13/45 463/31 |
| 2016/0129345 A1* | 5/2016 | Seok | A63F 13/213 463/31 |
| 2018/0147488 A1* | 5/2018 | Tang | A63F 13/426 |
| 2019/0205576 A1 | 7/2019 | Wang | |
| 2020/0368616 A1* | 11/2020 | Delamont | H04N 13/239 |
| 2022/0050149 A1* | 2/2022 | Li | G01R 33/072 |

FOREIGN PATENT DOCUMENTS

| | | |
|---|---|---|
| CN | 107450812 A | 12/2017 |
| CN | 108310772 A | 7/2018 |
| CN | 110064193 A | 7/2019 |
| CN | 111672114 A | 9/2020 |
| JP | 2018015542 A | 2/2018 |
| KR | 20180012790 A | 2/2018 |
| KR | 20190096919 A | 8/2019 |

OTHER PUBLICATIONS

First Chinese Office Action Issued in Application CN202010507449.2 dated May 18, 2021 with concise English Translation, (12 pages).

*The Internet*, "How to Use the Roulette in Honor of Kings", ttps://jingyan.baidu.com/article/17bd8e524b54a785ab2bb8c1.html, Sep. 18, 2017 (3 pages).

*The Internet*, "<300 Heroes> Let Mother Not Worry about Making Additional Attacks", http://news.17173.com/content/2013-04-10/20130410104747875.shtml, Apr. 10, 2013 (3 pages).

Honor of King Operation Team "Honor of Kings Operation Team", https://pvp.qq.com/webplat/info/news_version3/15592/24091/24092/24095/m15241/201605/459663.shtml, May 3, 2015 (3 pages).

Korean Office Action dated Sep. 12, 2023 in Application No. 10-2021-7034361 (21 pages).

Singaporean Search Report dated May 2, 2023 in Application No. 11202111626Y (11 pages).

[Assassin's Creed: Odyssey] Super OP's Strongest Bow and Arrow | Equipment and Skills Guide, Oct. 11, 2018, https://www.youtube.com/watch?v=qb2rlJOwF4M.

Perfect Use of Mini Map | Map Awareness & Farming Guide | Mobile Legends Bang Bang, Mar. 24, 2019, https://www.youtube.com/watch?v=jq35rGBhpns.

\* cited by examiner

METHOD AND APPARATUS FOR DETERMINING TARGET VIRTUAL OBJECT, TERMINAL, AND STORAGE MEDIUM

RELATED APPLICATIONS

This application is a continuation of International Application No. PCT/CN2021/094477 filed on May 19, 2021, which claims priority to Chinese Patent Application No. 202010507449.2 filed on Jun. 5, 2020. The entire disclosures of the prior applications are hereby incorporated by reference in their entirety.

FIELD OF THE TECHNOLOGY

This disclosure relates to the field of computer technologies, including to a method and apparatus for determining a target virtual object, a terminal, and a non-transitory computer-readable storage medium.

BACKGROUND OF THE DISCLOSURE

With the development of computer technologies and the diversification of terminal functions, the number of mobile phone games has increased, where a multiplayer online battle arena (MOBA) game has gradually become an extremely important game of the mobiles phone games. During a game, a controlled virtual object controlled by a terminal user may cause damage to another virtual object in a virtual scene by using a skill, for example, to reduce virtual health points of a virtual object hit by the skill. If the virtual health points of the virtual object are reduced to zero, the virtual object is defeated.

At present, in a terminal game, because a button used to trigger a skill is usually a virtual button, the terminal user is unlikely to precisely control the skill to hit an intended target virtual object. When the terminal user sets a hit condition to assist in determining a target virtual object to be hit by a skill, a virtual object that can be defeated by the skill may not satisfy the hit condition set by the user. As a result, a target virtual object determined by a terminal is not consistent with a target virtual object intended by the terminal user, leading to low human-computer interaction efficiency.

SUMMARY

Embodiments of this disclosure provide a method and apparatus for determining a target virtual object, a terminal, and a storage medium, which can make a target virtual object determined by a terminal consistent with a target virtual object intended by a terminal user, thereby improving the efficiency of human-computer interaction and optimizing user experience. The technical solutions are as follows:

According to an aspect, a method for determining a target virtual object is provided. In the method, a target search range corresponding to a target skill of a controlled virtual object is determined in response to a trigger operation of the target skill. The virtual object is controlled by a user. In response to the target search range including a plurality of first virtual objects in the target search range, at least one second virtual object that satisfies a defeated condition is obtained from the plurality of first virtual objects, the defeated condition indicating that a preset threshold of virtual health points will be reached after the target skill is performed on the first virtual object. A third virtual object that satisfies a target hit condition of the user is obtained from the at least one second virtual object. The target skill is performed on the third virtual object as the target virtual object.

According to an aspect, an apparatus includes processing circuitry. The processing circuitry is configured to determine a target search range corresponding to a target skill of a controlled virtual object in response to a trigger operation of the target skill, the virtual object being controlled by a user. The processing circuitry is configured to obtain, in response to the target search range including a plurality of first virtual objects in the target search range, at least one second virtual object that satisfies a defeated condition from the plurality of first virtual objects, the defeated condition indicating that a preset threshold of virtual health points will be reached after the target skill is performed on the first virtual object. The processing circuitry is further configured to obtain, from the at least one second virtual object by processing circuitry, a third virtual object that satisfies a target hit condition of the user, the target skill being performed on the third virtual object as a target virtual object.

According to an aspect, a terminal is provided, including one or more processors and one or more memories, the one or more memories storing at least one piece of program code, the at least one piece of program code being loaded and executed by the one or more processors to implement the operations performed in the method for determining a target virtual object according to any one of the foregoing possible implementations.

According to an aspect, a non-transitory computer-readable storage medium is provided. The non-transitory computer-readable storage medium stores instructions which when executed by a processor cause the processor to perform the method for determining the target virtual object.

According to an aspect, an application program product is provided, storing one or more instructions, the one or more instructions being executed by a processor of a computer device to implement the method for determining a target virtual object.

BRIEF DESCRIPTION OF THE DRAWINGS

To describe the technical solutions in embodiments of this disclosure more clearly, the following briefly describes the accompanying drawings required for describing the embodiments. The accompanying drawings in the following description show merely some embodiments of this disclosure, and a person of ordinary skill in the art may still derive other accompanying drawings from these accompanying drawings.

DESCRIPTION OF EMBODIMENTS

Figure 1:
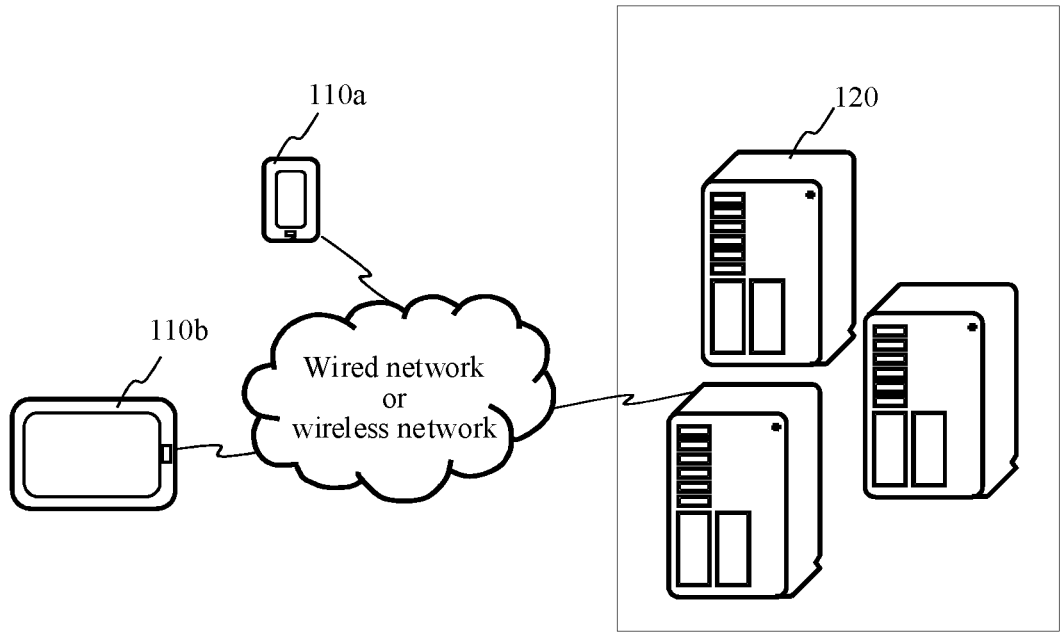
FIG. 1 is an exemplary schematic diagram of an implementation environment of a method for determining a target virtual object according to an embodiment of this disclosure.

To make objectives, technical solutions, and advantages of this disclosure clearer, the following further describes implementations of this disclosure in detail with reference to the accompanying drawings.

The terms "first", "second", and the like in this disclosure are used for distinguishing between same items or similar items of which effects and functions are basically the same. It is to be understood that, the "first", "second", and "nth" do not have a dependency relationship in logic or time sequence, and a quantity and an execution order thereof are not limited.

The term "at least one" in this disclosure means one or more and "a plurality of" means two or more. For example, a plurality of first positions means two or more first positions.

For ease of understanding the technical solutions in the embodiments of this disclosure, some terms involved in the embodiments of this disclosure are explained below.

Virtual scene: a virtual scene displayed (or provided) when an application program is run on a terminal. The virtual scene may be a simulated environment of a real world, or may be a semi-simulated and semi-fictional virtual environment, or may be an entirely fictional virtual environment. The virtual scene may be any one of a two-dimensional virtual scene, a 2.5-dimensional virtual scene, and a three-dimensional virtual scene. A dimension of the virtual scene is not limited in the embodiments of this disclosure.

For example, the virtual scene may include the sky, the land, the ocean, or the like. The land may include environmental elements such as the desert and a city. The user may control a virtual object to move in the virtual scene. In some embodiments, the virtual scene may be further used for a virtual scene battle between at least two virtual objects, and virtual resources available to the at least two virtual objects are provided in the virtual scene.

For example, the virtual scene may include two symmetric regions. Virtual objects that belong to two opposing camps occupy the regions respectively, and a goal of each side is to destroy a target building/stronghold/fort/crystal deep in the opponent's region to win victory. The symmetric regions are, for example, a lower left corner region and an upper right corner region, or a left side intermediate region and a right side intermediate region. In the embodiments of this disclosure, the camp is an object set including a plurality of virtual objects.

Virtual object: a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

For example, when the virtual scene is a three-dimensional virtual scene, the virtual object may be a three-dimensional model, and the three-dimensional model may be a three-dimensional character constructed based on three-dimensional human skeleton technology. The same virtual object may show different external appearances by wearing different skins. In some embodiments, the virtual object may be alternatively implemented by using a 2.5-dimensional model or a two-dimensional model. This is not limited in the embodiments of this disclosure.

In some embodiments, the virtual object may be a player character controlled through an operation on a client, or may be an artificial intelligence (AI) character set in a virtual scene battle through training, or may be a non-player character (NPC) set in a virtual scene interaction. In an embodiment, the virtual object may be a virtual character performing sports in the virtual scene. In an embodiment, a quantity of virtual objects participating in the interaction in the virtual scene may be preset, or may be dynamically determined according to a quantity of clients participating in the interaction.

NPC object: a virtual object that is not controlled by a user, which, in some forms, may include various forms such as a virtual creature, a virtual item, and a virtual ghost. The NPC object may belong to a user camp participating in contention, or may not belong to any user camp participating in the contention (i.e., a neutral virtual object).

Neutral virtual object: an NPC object that does not belong to any user camp participating in contention, which may be referred to as the "neutral virtual object". The neutral virtual object may perform contention behavior with a virtual object of any user camp participating in the contention. In other words, the neutral virtual object may attack the virtual object of any user camp participating in the contention, or may be attacked by the virtual object of any user camp participating in the contention. For example, the neutral virtual object may include a first virtual object and a second virtual object involved in the embodiments of this disclosure. The neutral virtual object is usually used as a competitive resource, and provides a gain effect for a capturing party. For example, the neutral virtual object may be contended by various user camps participating in the contention, and a camp to which a user who is the first to defeat (or kill) the neutral virtual object belongs may obtain the gain effect provided by the neutral virtual object.

MOBA game: a game in which several forts are provided in a virtual scene, and users belonging to different camps control virtual objects to battle in the virtual scene, occupy forts or destroy forts belonging to the opposing camp. For example, in the MOBA game, users may be divided into at least two opposing camps, and different virtual teams in the at least two opposing camps occupy respective map regions, and compete against each other using specific victory conditions as goals. The victory conditions include, but are not limited to at least one of occupying forts or destroying forts belonging to the opposing camps, killing virtual objects belonging to the opposing camps, ensuring own survival in a specified scenario and time, seizing a specific resource, and surpassing interactive scores of the opponent within a specified time. For example, in a mobile phone MOBA game, users may be divided into two opposing camps. The virtual objects controlled by the users are scattered in a virtual scene to compete against each other, and the victory condition is to destroy or occupy all enemy forts.

In some embodiments, each virtual team includes one or more virtual objects, for example, 1, 2, 3, or 5. According to a quantity of virtual objects in each team participating in a battle arena, the battle arena may be divided into a 1V1 battle, a 2V2 battle, a 3V3 battle, a 5V5 battle, and the like, where "1V1" means "1 versus 1". Details are not described herein.

In some embodiments, the MOBA game may take place in rounds, and each round of the battle arena may have the same map or different maps. A duration of one round of the MOBA game is from a moment at which the game starts to a moment at which the victory condition is met.

In the MOBA game, the user may control a virtual object to fall freely, glide, parachute, or the like in the sky of the virtual scene, or run, jump, crawl, walk in a stooped posture, or the like on the land, or may control a virtual object to swim, float, dive, or the like in the ocean. Herein, the scenes are merely used as examples for description, which are not specifically limited in the embodiments of this disclosure.

In the MOBA game, the user may further control the virtual object to cast skills to fight with other virtual objects. For example, skill types of the skills may include an attack skill, a defense skill, a healing skill, a carry skill, an execution skill, and the like. Each virtual object may have one or more fixed skills, and different virtual objects generally have different skills, and different skills may produce different effects. For example, if an attack skill cast by a virtual object hits a hostile virtual object, certain damage is caused to the hostile virtual object, which is generally shown as deducting a part of virtual health points of the hostile virtual object. In another example, if a healing skill cast by a virtual object hits a friendly virtual object, certain healing is produced for the friendly virtual object, which is generally shown as restoring a part of virtual health points of the friendly virtual object, and all other types of skills may produce corresponding effects. Details are not described herein again.

An exemplary system architecture applicable to this disclosure is described below.

FIG. 1 is an exemplary schematic diagram of an implementation environment of a method for determining a target virtual object according to an embodiment of this disclosure. Referring to FIG. 1, the implementation environment includes a terminal, such as a terminal 110a or a terminal 110b, and a server 120.

The terminal and the server 120 may be directly or indirectly connected in a wired or wireless communication manner. This is not limited in this disclosure.

The terminal may be a smartphone, a tablet computer, a notebook computer, a desktop computer, a smart speaker, a smartwatch, or the like, but is not limited thereto. An application program supporting a virtual scene is installed and run on the terminal. The application program may be any one of a MOBA game, a massively multiplayer online role-playing game (MMORPG), a first-person shooter (FPS) game, a third-person shooter game, a virtual reality application program, a three-dimensional map program, a military simulation program, and a multiplayer gunfight survival game.

For example, the terminal may be used by a user, and the application program running on the terminal logs in to a user account. The user uses the terminal to operate a controlled virtual object located in a virtual scene to perform activities. The activities include, but are not limited to: at least one of casting skills, adjusting body postures, crawling, walking, running, riding, jumping, driving, picking, shooting, attacking, and throwing. For example, the controlled virtual object is a virtual character such as a simulated character role or a cartoon character role.

The server 120 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform. The server 120 is configured to provide a backend service for an application program supporting a virtual scene.

In some embodiments, the server 120 may take on primary computing work, and the terminal may take on secondary computing work; the server 120 takes on secondary computing work, and the terminal takes on primary computing work; the server 120 or the terminal 110 may separately take on classification work; or collaborative computing is performed by using a distributed computing architecture between the server 120 and the terminal 110.

In some embodiments, the server 120 may be formed by an access server, a backend server, and a database server. The access server is configured to provide an access service for the terminal. The backend server is configured to provide a backend service of an application program of a virtual scene. There may be one or more backend servers. When there are a plurality of backend servers, at least two backend servers are configured to provide different services, and/or at least two backend servers are configured to provide the same service, for example, provide the same service in a load balancing manner. This is not limited in the embodiments of this disclosure.

The terminal may generally refer to one of a plurality of terminals. In this embodiment, the terminal is merely used as an example for description. Application programs installed on the terminals may be the same, or the application programs installed on the two terminals are the same type of application programs on different operating system platforms. A person skilled in the art may learn that there may be more or fewer terminals. For example, there may be only one terminal, or there may be tens of or hundreds of terminals or more. The quantity and the device type of the terminals are not limited in the embodiments of this disclosure.

In some embodiments, the virtual object controlled by the terminal and another virtual object controlled by another terminal are in the same virtual scene. In this case, the controlled virtual object may perform adversarial interaction with the other virtual object in the virtual scene. The controlled virtual object and the other virtual object may be in a hostile relationship, for example, the controlled virtual object and the other virtual object may belong to different teams and camps. The virtual objects in the hostile relationship may battle against each other by casting skills, for example, the controlled virtual object casts an attack skill to the other virtual object. In some other embodiments, the controlled virtual object and the other virtual object may be alternatively in a teammate relationship, for example, a target virtual character and another virtual character may belong to the same team or the same organization, have a friend relationship, or have a temporary communication permission. In this case, the controlled virtual object may cast a healing skill to the other virtual object.

Figure 2:
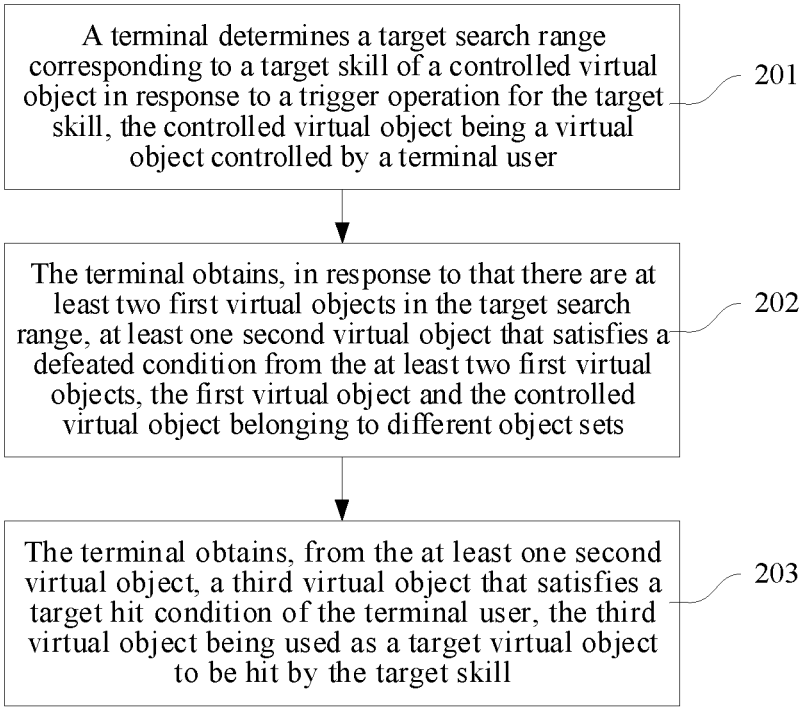
FIG. 2 is an exemplary flowchart of a method for determining a target virtual object according to an embodiment of this disclosure.

FIG. 2 is an exemplary flowchart of a method for determining a target virtual object according to an embodiment of this disclosure. In this embodiment of this disclosure, an example in which the method is applied to a terminal is used. The terminal may be the terminal 110a or the terminal 110b shown in FIG. 1. Referring to FIG. 2, the method for determining a target virtual object can include the following steps:

In step 201, the terminal determines a target search range corresponding to a target skill of a controlled virtual object in response to a trigger operation for the target skill, the controlled virtual object being a virtual object controlled by a terminal user.

In an embodiment of this disclosure, the controlled virtual object has at least one skill that may perform adversarial interaction with a first virtual object of a hostile object set (e.g., a hostile camp). The terminal user may trigger the skill by performing trigger operations such as clicking/tapping and dragging on the trigger option of the skill. When the target skill of the controlled virtual object is triggered, the terminal may obtain the trigger operation for the target skill. The terminal may use a position of the controlled virtual object as the center, and use a first virtual object found in a specific search range as an optional target of the target skill. Because different skills correspond to different search ranges, there are different quantities of first virtual objects in the target search range.

In step 202, the terminal obtains, in response to there being at least two first virtual objects in the target search range, at least one second virtual object that satisfies a defeated condition from the at least two first virtual objects, the first virtual object and the controlled virtual object belonging to different object sets.

In an embodiment of this disclosure, the defeated condition indicates whether virtual health points of the first virtual object reach a preset threshold after the target skill is performed on the first virtual object. The target skill triggered by the controlled virtual object may be an attack skill for reducing the virtual health points of the first virtual object. When the virtual health points of the first virtual object are reduced to zero, the first virtual object is defeated. If the target skill can reduce virtual health points of any first virtual object to zero, the first virtual object is a first virtual object that satisfies the defeated condition.

In step 203, the terminal obtains, from the at least one second virtual object, a third virtual object that satisfies a target hit condition of the terminal user, the third virtual object being used as a target virtual object to be hit by the target skill.

In an embodiment of this disclosure, the target hit condition indicates whether the third virtual object is used as a processing target of the target skill. The terminal user may set a hit condition: for example, a virtual object has the lowest virtual health point percentage, a virtual object is closest to the controlled virtual object, or a virtual object has the lowest virtual health points. The terminal may select, according to the target hit condition set by the terminal user, a third virtual object that satisfies the target hit condition as the target virtual object, that is, the target virtual object to be hit by the target skill. The target virtual object is defeated after being hit by the target skill.

In an embodiment of this disclosure, the at least one second virtual object that satisfies the defeated condition, that is, can be defeated by the target skill, is obtained from at least two first virtual objects obtained within a search range corresponding to the target skill, and then the target hit condition set by the terminal user is used for screening, so that the target virtual object determined by the terminal is consistent with a target virtual object intended by the terminal user, thereby improving the efficiency of human-computer interaction.

Figure 3:
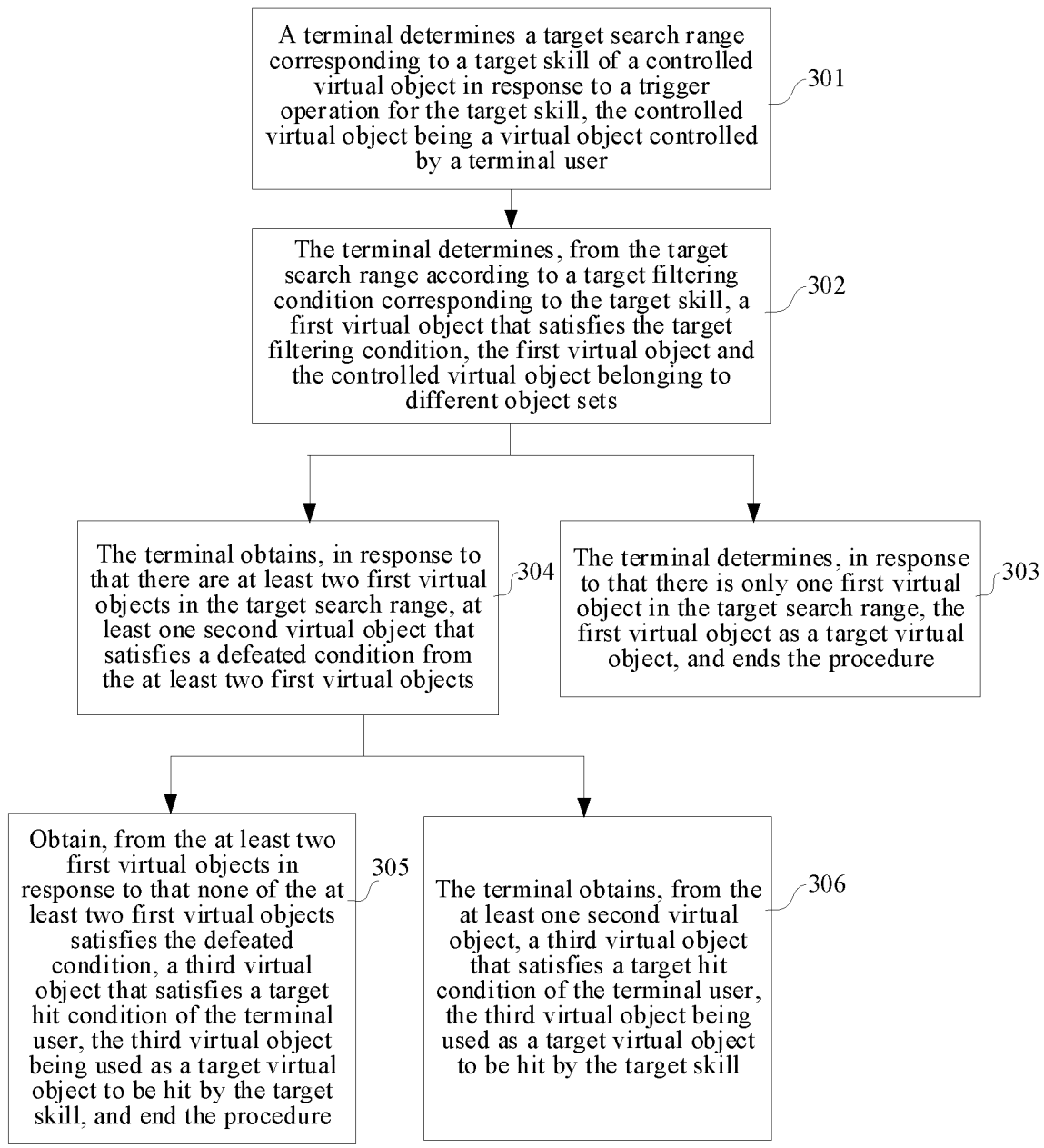
FIG. 3 is an exemplary flowchart of a method for determining a target virtual object according to an embodiment of this disclosure.

FIG. 3 is an exemplary flowchart of a method for determining a target virtual object according to an embodiment of this disclosure. In an embodiment of this disclosure, an example in which the method is applied to a terminal is used. The terminal may be the terminal 110a or the terminal 110b shown in FIG. 1. Referring to FIG. 3, the method for determining a target virtual object can include the following steps:

In step 301, the terminal determines a target search range corresponding to a target skill of a controlled virtual object in response to a trigger operation for the target skill, the controlled virtual object being a virtual object controlled by a terminal user.

In an embodiment of this disclosure, during a game, the terminal user may control the virtual object to interact with other virtual objects in a virtual scene. The controlled virtual object has at least one skill that can be triggered, and the skill may be one of an attack skill, a defense skill, a healing skill, a carry skill, and an execution skill. The attack skill is generally shown as deducting part of the virtual health points of a hit first virtual object belonging to a hostile camp after the first virtual object is hit. In addition, generally, the attack skill cannot select a second virtual object belonging to a friendly camp as a target to be hit. The terminal user may trigger corresponding skills by triggering trigger options of different skills, and the terminal can detect the trigger operations when the skills are triggered.

A manner of triggering a skill is briefly described below.

In a MOBA game running on the terminal, a trigger option of a skill in the MOBA game is usually displayed in the form of a skill joystick. The skill joystick is a virtual button, including a first region and a second region. The first region is used for quickly triggering a skill corresponding to the skill joystick, and is usually referred to as quick casting. The second region is used for selecting, by the terminal user through a drag operation, a target to be hit by the skill corresponding to the skill joystick, and is usually referred to as active aiming.

Figure 4:
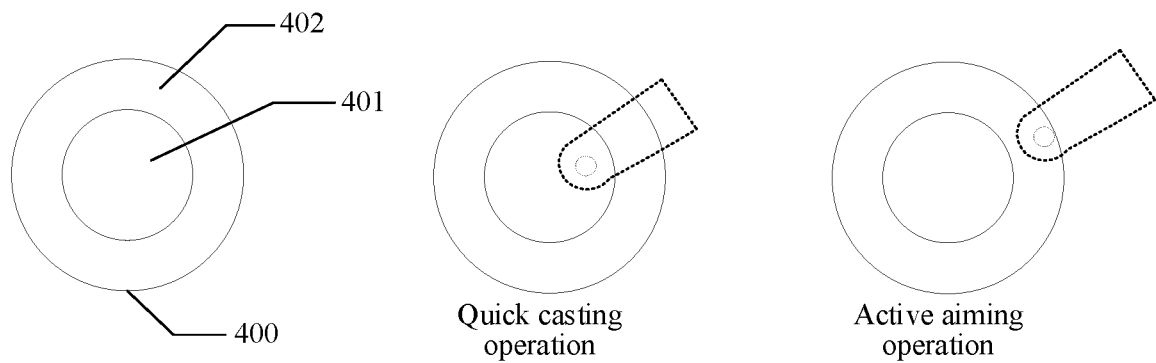
FIG. 4 is an exemplary schematic diagram of a manner of triggering a skill according to an exemplary embodiment of this disclosure.

For example, FIG. 4 is a schematic diagram of a manner of triggering a skill according to an exemplary embodiment of this disclosure. FIG. 4 includes a skill joystick 400. The skill joystick 400 includes a first region 401 and a second region 402. The first region 401 is a circle with a skill activation point being the center and a radius of r, and the second region 402 is an annular region outside the first region 401, r being a positive number. A terminal user may click/tap the first region 401 to implement quick casting, and the terminal user may press the skill joystick and drag the skill joystick to the second region 402 to implement active aiming.

When the terminal user triggers a skill in different manners, the terminal determines a target search range corresponding to a target skill in different manners.

When the terminal user triggers a skill in a manner of quick casting, the terminal may use a circular region with a current second scene position of the controlled virtual object being the center and a radius of N as the target search range corresponding to the skill, N being a positive number.

Figure 5:
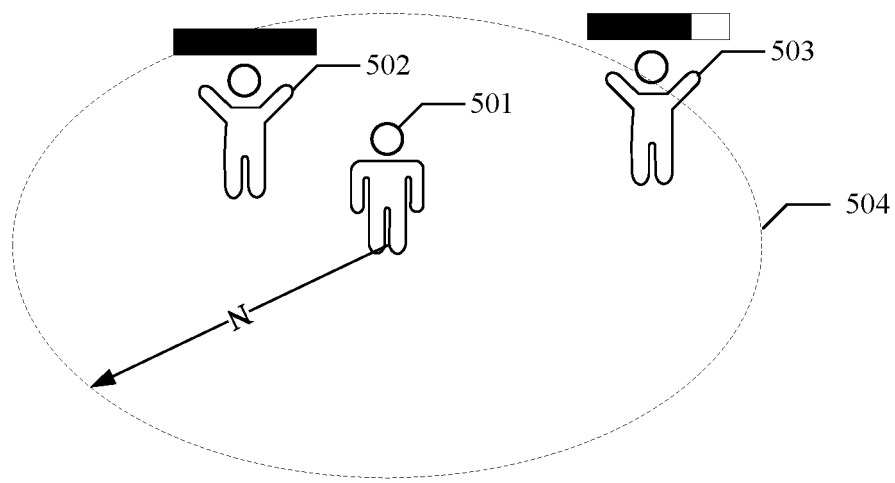
FIG. 5 is an exemplary schematic diagram of a target search range according to an embodiment of this disclosure.

For example, FIG. 5 is an exemplary schematic diagram of a target search range according to an embodiment of this disclosure. As shown in FIG. 5, a controlled virtual object 501, a first virtual object 502, and a first virtual object 503 are included in FIG. 5. A dashed-line region 504 is a circular region with a second scene position of the controlled virtual object 501 being the center and a radius of N, and the dashed-line region 504 is the target search range. The radius N may be a sum of a skill casting range parameter and a skill search range parameter.

When the terminal user triggers a skill in a manner of active aiming, the terminal may determine the target search range corresponding to the skill according to a distance by which the terminal user drags a trigger option and the current second scene position of the controlled virtual object.

Correspondingly, the step of determining, by the terminal, a target search range corresponding to a target skill may be as follows: The terminal may obtain a first screen position and a second screen position in response to a drag operation performed on a trigger option of the target skill, the first screen position being a start position, and the second screen position being an end position. The terminal may determine a first scene position corresponding to the target skill in a virtual scene according to the first screen position and the second screen position, the first scene position being a central position of the target search range. The terminal may determine the target search range corresponding to the target skill according to the first scene position, a second scene position of the controlled virtual object, and skill range information of the target skill, the skill range information including a skill casting range parameter and a skill search range parameter. A first scene position is determined according to a relative position of the trigger option dragged by the terminal user, and the target search range corresponding to the target skill is determined with reference to the second scene position of the controlled virtual object and the skill range information, so that the target search range includes a first virtual object intended by the terminal user, thereby improving the efficiency of human-computer interaction.

Figure 6:
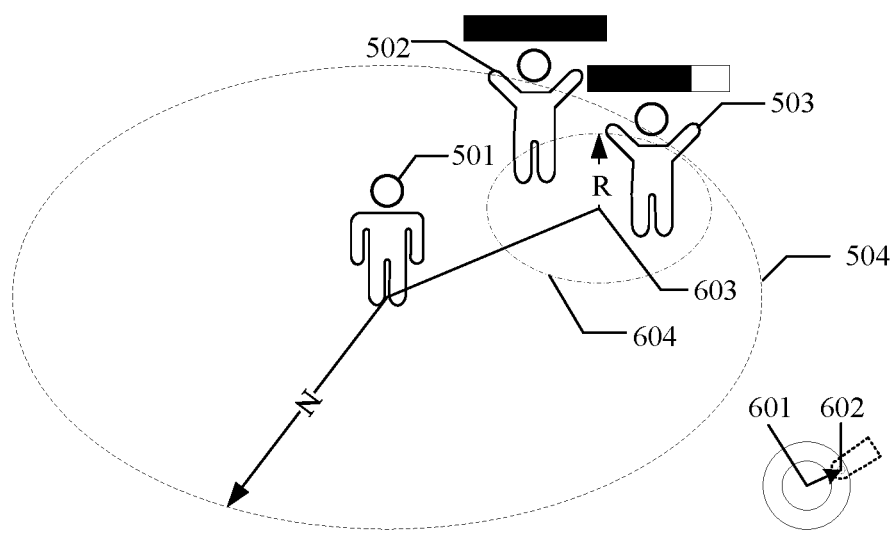
FIG. 6 is an exemplary schematic diagram of another target search range according to an embodiment of this disclosure.

For example, FIG. 6 is a schematic diagram of another target search range according to an embodiment of this disclosure. As shown in FIG. 6, a controlled virtual object 501, a first virtual object 502, a first virtual object 503, a dashed-line region 504 that is a circular region with a second scene position of the controlled virtual object 501 being the center and a radius of N, a first screen position 601, a second screen position 602, a first scene position 603, and a dashed-line region 604 that is a circular region with the first scene position 603 being the center and a radius of R are included in FIG. 6. The dashed-line region 604 is a target search range.

In an implementation, a distance between the first screen position and the second screen position may be mapped to a distance between a first scene position and a second scene position through a proportional relationship. Correspondingly, the step of determining, by a terminal, a first scene position corresponding to the target skill in a virtual scene according to the first screen position and the second screen position may be as follows: The terminal may determine the first position information according to the first screen position, the second screen position, and a third screen position corresponding to a screen center, the first position information being used for indicating a direction of the first scene position relative to the second scene position. Then, the terminal may determine second position information according to the first screen position, the second screen position, drag range information of the trigger option of the target skill, and the skill range information of the target skill, the second position information being used for indicating a distance between the first scene position and the second scene position. Finally, the terminal may determine the first scene position corresponding to the target skill in the virtual scene according to the second scene position, the first position information, and the second position information.

Because a change from the first screen position to the second screen position is mapped to a change from the second scene position to the first scene position in the virtual scene, the first scene position is a position intended by a terminal user, thereby improving the efficiency of human-computer interaction.

The terminal may express proportional relationships of distances between the positions by using the following Formula (1):

$$\frac{|DragPos - DownPos|}{MaxDragRadius} = \frac{|FocusPoint - HeroPos|}{SkillRange} \quad (1)$$

where DownPos represents a first screen position, DragPos represents a second screen position, MaxDragRadius represents a maximum drag range indicated by drag range information of a trigger option of a target skill, FocusPoint represents a first scene position, HeroPos represents a current second scene position of a controlled virtual object, and SkillRange represents a skill casting range indicated by skill range information of the target skill.

Based on the proportional relationships, the terminal may map a third screen position corresponding to a screen center (0, 0) to the virtual scene by using a center mapping method, to obtain a third scene position. Subsequently, a fourth scene position is obtained through mapping according to a sum of distance differences between the screen center and the first screen position and between the screen center and the second screen position. A direction from the third scene position to the fourth scene position is the same as a direction from the second scene position points to the first scene position. Therefore, the first scene position may be calculated by using the following Formula (2):

$$FocusPoint = \quad (2)$$
$$HeroPos + \frac{|DragPos - DownPos|}{MaxDragRadius} \times SkillRange \times \text{Normalize}$$
$$(ScreenDrag2ScenePos - ScreenCenter2SencePos)$$

where FocusPoint represents the first scene position, HeroPos represents a current second scene position of a controlled virtual object, SkillRange represents a skill casting range indicated by skill range information of the target skill, Normalize( ) represents normalization, ScreenCenter2SencePos represents the third scene position, and ScreenDrag2ScenePos represents the fourth scene position.

The terminal may invoke an application programming interface for searching for the first virtual object, to search for the first virtual object included in the target search range. The terminal may use a plurality of parameters such as a skill identifier and skill casting range information of the target skill and the first scene position as input parameters of the application programming interface.

In step 302, the terminal determines, from the target search range according to a target filtering condition corresponding to the target skill, a first virtual object that satisfies the target filtering condition, the first virtual object and the controlled virtual object belonging to different object sets.

In this embodiment of this disclosure, the terminal may store, in the form of a list, objects that can be used as targets of the target skill in the target search range, and obtain the target filtering condition corresponding to the target skill, to delete, from the list, an object that does not satisfy the target filtering condition, so that the remaining objects are the objects that satisfy the target filtering condition. The target filtering condition may be a condition set by a technician for the target skill, for example: an object type of a target is a virtual object, a target is a virtual object belonging to an enemy camp, a virtual object is in a visible state, and a virtual object is in a selectable state. This is not limited in this embodiment of this disclosure. Different objects such as the first virtual object can be obtained through filtering by setting different filtering conditions.

For example, the target skill may act on a first virtual object belonging to the enemy camp, or may act on a building that belongs to the enemy camp, or may act on a neutral virtual object. The terminal may delete, from the list according to the target filtering condition, an object that does not belong to the first virtual object, a building that does not belong to the enemy camp, and an object that does not belong to the neutral virtual object. In another example, the target skill cannot act on virtual objects in an invisible state and an unselectable state, and the terminal may delete the virtual objects in an invisible state and an unselectable state from the list.

In step 303, the terminal determines, in response to that there is only one first virtual object in the target search range, the first virtual object as a target virtual object, and ends the procedure.

In an embodiment of this disclosure, if there is only one first virtual object in the target search range, the terminal does not need to perform excessive determination on the first virtual object. The first virtual object is the target virtual object intended by the terminal user. The terminal may directly determine the first virtual object as the target virtual object.

In step 304, the terminal obtains, in response to there being at least two first virtual objects in the target search range, at least one second virtual object that satisfies a defeated condition from the at least two first virtual objects.

In an embodiment of this disclosure, the target skill may cause damage to the first virtual object, to reduce virtual health points of the first virtual object. If the target skill can reduce the virtual health points of the first virtual object to zero, the target skill can defeat the first virtual object, that is, the first virtual object satisfies the defeated condition.

In an implementation, the target skill may cause various types of damage such as single damage, splash damage, physical damage, magic damage, and real damage. The damage types are not limited in this embodiment of this disclosure.

Correspondingly, the step of obtaining, by the terminal, at least one second virtual object that satisfies a defeated condition from the at least two first virtual objects may be as follows: The terminal performs the following processing on any one of the at least two first virtual objects: obtaining at least one damage type corresponding to the target skill; accumulating a damage value corresponding to the at least one damage type, to obtain a total damage value; and determining, in response to that the total damage value is greater than current virtual health points of the first virtual object, the first virtual object as the second virtual object that satisfies the defeated condition.

Damage values of various types of damage caused by the target skill are added and it is then determined whether each first virtual object satisfies the defeated condition, the first virtual object that can be defeated by the target skill may be determined more accurately, thereby fulfilling the terminal user and improving the efficiency of human-computer interaction.

For example, the target skill may cause damage of three types, namely, a damage type A, a damage type B, and a damage type C. The terminal may accumulate damage values a, b, and c caused by the three damage types, to obtain a total damage value, and it is determined through the total damage value whether the first virtual object can be defeated.

Figure 7:
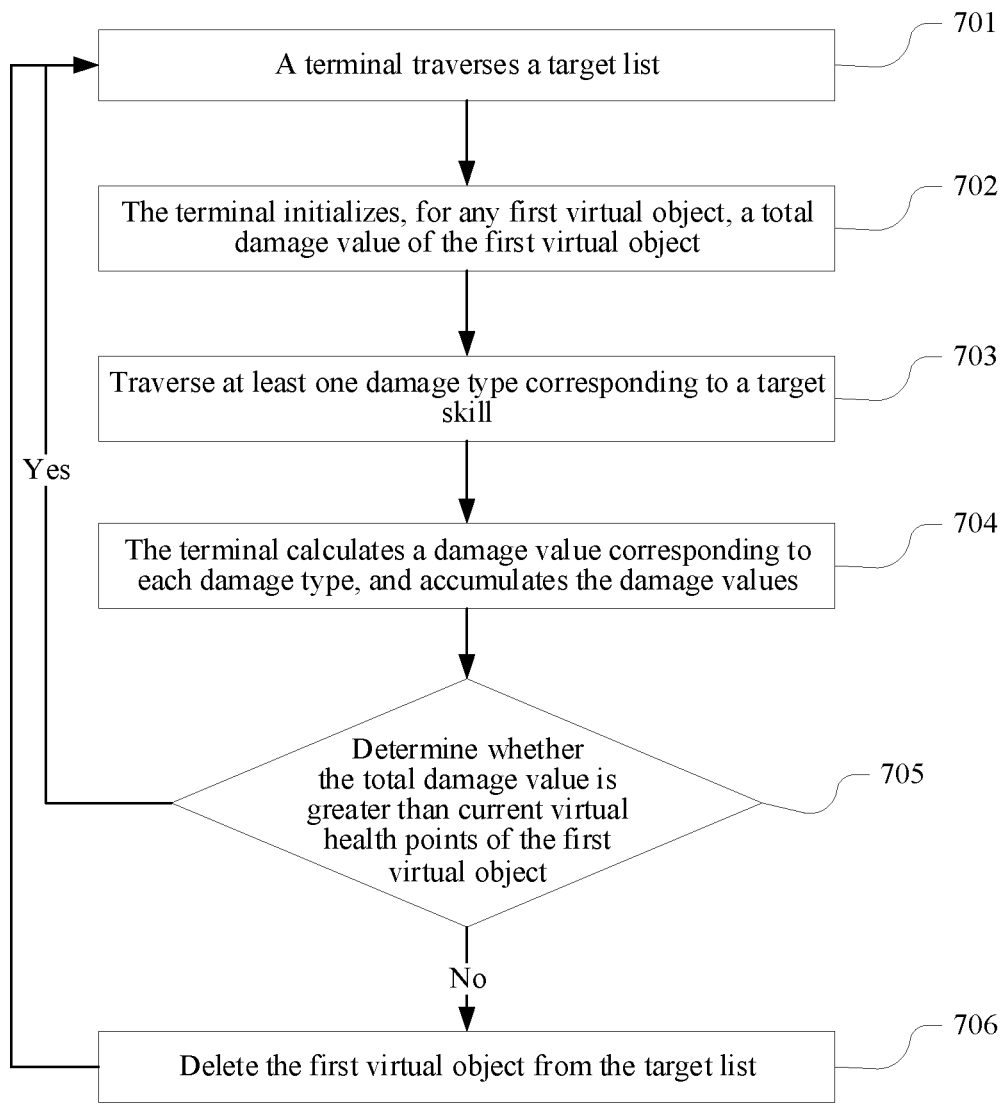
FIG. 7 is an exemplary schematic flowchart of obtaining a first virtual object that satisfies a defeated condition according to an embodiment of this disclosure.

Correspondingly, for a procedure of determining, by the terminal, whether different first virtual objects satisfy the defeated condition, reference may be made to FIG. 7. FIG. 7 is a schematic flowchart of obtaining a first virtual object that satisfies a defeated condition according to an embodiment of this disclosure. As shown in FIG. 7, the at least two first virtual objects determined by the terminal within the target search range are stored in the form of a list, to obtain a target list.

In step 701, the terminal traverses the target list.

In step 702, the terminal initializes, for any first virtual object, a total damage value of the first virtual object, that is, sets HurtValue=0.

In step 703, at least one damage type corresponding to a target skill is traversed.

In step 704, the terminal calculates a damage value curHurt corresponding to each damage type, and accumulates the damage values, that is, HurtValue=HurtValue+curHurt.

In step 705, a determination is made as to whether the total damage value is greater than current virtual health points of the first virtual object, if the total damage value is greater than the current virtual health points of the first virtual object, process a next first virtual object, and if the total damage value is not greater than the current virtual health points of the first virtual object, perform step 706.

In step 706, the first virtual object is deleted from the target list if the total damage value is not greater than the current virtual health points of the first virtual object.

In step 305, a third virtual object that satisfies a target hit condition of the terminal user is obtained, from the at least two first virtual objects, in response to none of the at least two first virtual objects satisfying the defeated condition, the third virtual object being used as a target virtual object to be hit by the target skill, and the procedure ends.

In an embodiment of this disclosure, before the game starts or during the game, the terminal user may set different hit conditions, for example: a remaining virtual health point value takes priority, a virtual health point percentage takes priority, a distance to a controlled virtual object takes priority, and a distance to a first scene position takes priority. The terminal may determine, according to the target hit condition of the terminal user, the first virtual object that best satisfies the target hit condition from the at least two first virtual objects as the target virtual object.

If the target hit condition set by the terminal user is that the remaining virtual health point value takes priority, that is, a first virtual object with the smallest remaining virtual health point value is preferentially selected as the target virtual object, the terminal may sort the at least two first virtual objects in ascending order according to current remaining virtual health point values, and then returns the first virtual object that ranks the first place.

In another example, if the target hit condition set by the terminal user is that the virtual health point percentage takes priority, that is, a first virtual object with the smallest remaining virtual health point percentage is preferentially selected as the target virtual object, the terminal may sort the at least two first virtual objects in ascending order according to current remaining virtual health point percentages, and then returns the first virtual object that ranks the first place.

Similarly, if the target hit condition is that the distance to the controlled virtual object takes priority, the first virtual object closest to the controlled virtual object is preferentially selected as the target virtual object. If the target hit condition is that the distance to the first scene position takes priority, the first virtual object closest to the first scene position is preferentially selected as the target virtual object. The target hit condition is not limited in this embodiment of this disclosure.

For example, a first virtual object A has total virtual health points of 1000 and current virtual health points of 300. A first virtual object B has total virtual health points of 500 and current virtual health points of 200. When the target hit condition is that the remaining virtual health point value takes priority, the first virtual object B is the target virtual object. When the target hit condition is that the virtual health point percentage takes priority, the first virtual object A is the target virtual object.

In step 306, the terminal obtains, from the at least one second virtual object, a third virtual object that satisfies a target hit condition of the terminal user, the third virtual object being used as a target virtual object to be hit by the target skill.

In an embodiment of this disclosure, if the terminal obtains at least one second virtual object that can be defeated by the target skill, the terminal may further screen the at least one second virtual object according to the target hit condition of the terminal user. Reference may be made to step 305, and details are not described herein.

Figure 8:
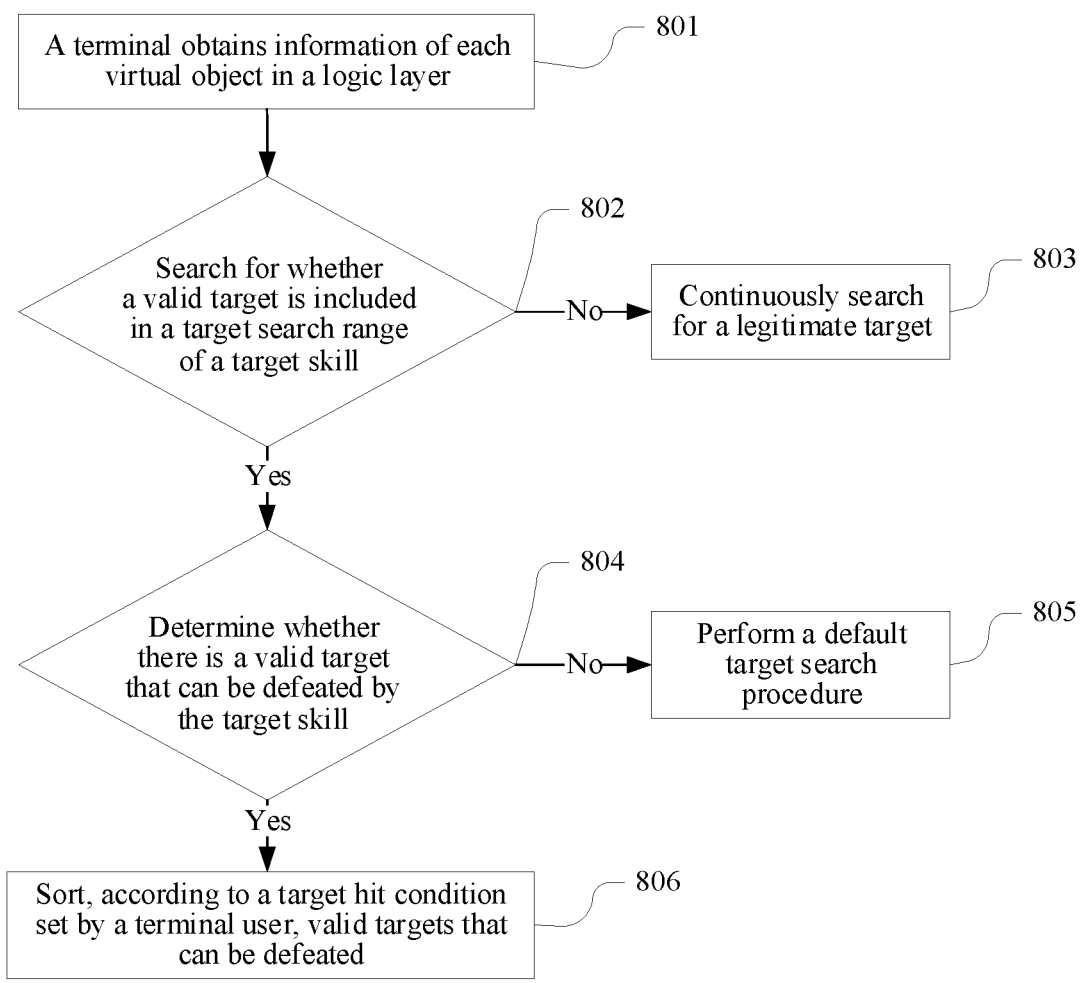
FIG. 8 is an exemplary schematic flowchart of another method for determining a target virtual object according to an embodiment of this disclosure.

Step 301 to step 306 are an exemplary embodiment of the method for determining a target virtual object provided in the embodiments of this disclosure, and other implementations are possible. FIG. 8 is an exemplary schematic flowchart of another method for determining a target virtual object according to an embodiment of this disclosure. The method is applied to a terminal, and the terminal may be the terminal 110a or the terminal 110b shown in FIG. 1.

A logic layer is provided in the terminal for logical operation of data and transmitting the data obtained after the operation to a presentation layer for execution. The presentation layer is further provided in the terminal for managing an input of the terminal user through an operation interface, transmitting a data packet to a server, and executing the data transmitted by the logic layer. The server is disposed on a server side for receiving the data transmitted in the presentation layer and synchronizing the data to a logic layer of a client.

As shown in FIG. 8, the method can include the following steps:

In step 801, the terminal obtains information of each virtual object in the logic layer.

In step 802, a search is performed for whether a valid target is included in a target search range of a target skill, that is, a virtual object that can be hit by the target skill, and if no valid target is included, step 803 is performed, or if a valid target is included, step 804 is performed.

In step 803, a continuous search is performed for a valid target.

In step 804, a determination is made as to whether there is a valid target that can be defeated by the target skill, and if not, step 805 is performed, or if yes, step 806 is performed.

In step 805, a default target search procedure is performed. For example, a target virtual object is selected according to a target hit condition.

In step 806, valid targets that can be defeated are sorted according to the target hit condition set by a terminal user.

In step 807, a valid target with the highest priority is selected as the target virtual object.

In an embodiment of this disclosure, at least one second virtual object that can be defeated by the target skill is obtained from at least two first virtual objects obtained within a search range corresponding to the target skill, and then the target hit condition set by the terminal user is used for screening, so that the target virtual object determined by the terminal is consistent with a target virtual object intended by the terminal user, thereby improving the efficiency of human-computer interaction.

FIG. 3 shows an exemplary implementation of a method for determining a target virtual object according to an embodiment of this disclosure. In an embodiment of this disclosure, a target virtual object may be determined through complex search logic, and the search logic may be referred to as a search tree.

Figure 9:
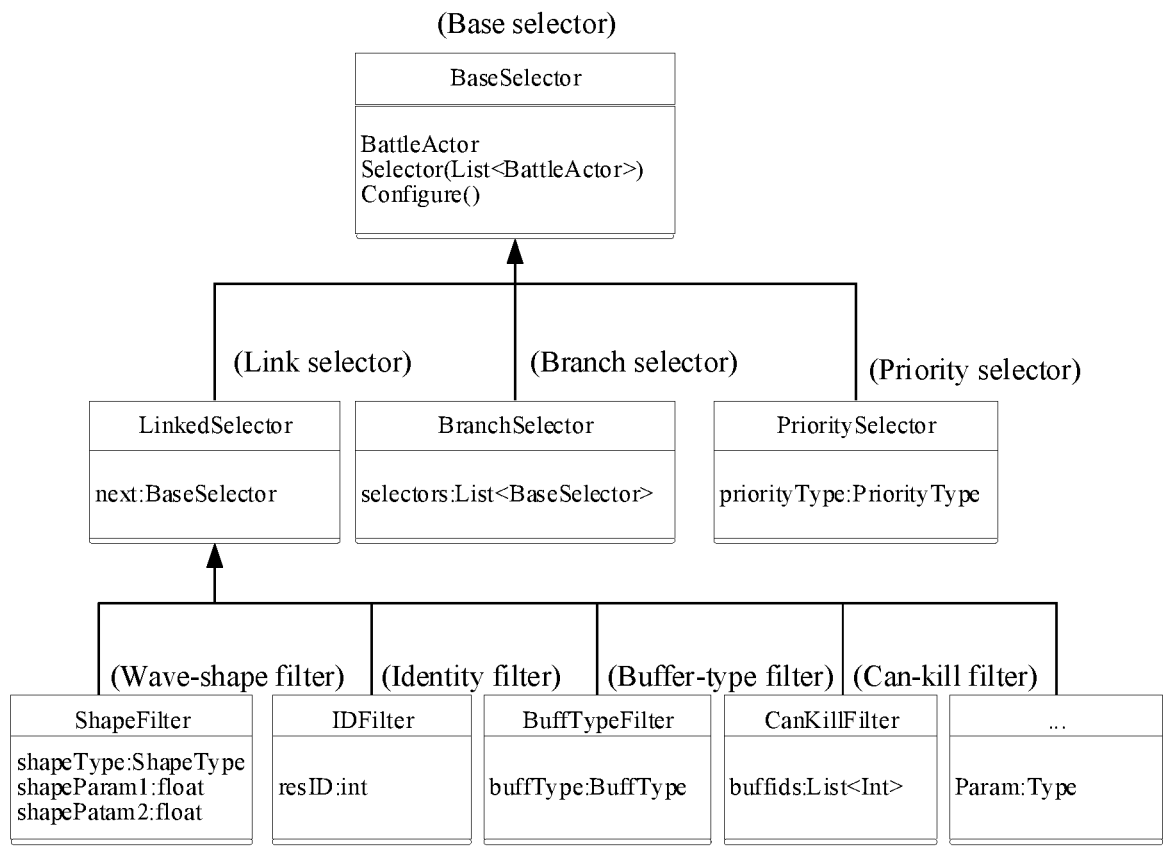
FIG. 9 is an exemplary structural diagram of a class diagram of a search tree according to an embodiment of this disclosure.

FIG. 9 is an exemplary structural diagram of a class diagram of a search tree according to an embodiment of this disclosure. As shown in FIG. 9, all nodes in the search tree are inherited from a base selector. The base selector includes three core derived subclasses: a link selector, a branch selector, and a priority selector.

The base selector mainly includes two methods: a configuration function Configure ( ) and a selection function Select ( ). The configuration function is used for initializing data of selectors through table data configured by a technician. For example, the branch selector needs to be configured with a plurality of branches, and data configured for the configuration function is IDs of several branch selectors. In another example, a subclass wave-shape filter of the link selector needs to be configured with shape fields, such as a circle, a sector, a circle radius, a sector angle, and other parameters. An input parameter of the selection function is List<BattleActor>, which is a list storing virtual objects, and a return parameter is BattleActor, that is, a virtual object.

The following introduces examples of the three core derived subclasses of the base selector respectively.

Link selector: the core of the link selector is a next parameter, which is used for indicating a next required filter, to form a chain-like structure. The link selector includes a plurality of subclasses. The plurality of subclasses are basically filters and mainly configured to delete, from the parameters in the selection function, virtual objects that do not satisfy conditions, and transfer the List<BattleActor> with the virtual objects deleted to a next selector. In this way, the virtual objects are screened.

For example, the wave-shape filter configures required graphics and parameters in the configuration function. The selection function determines whether the virtual objects in the parameter List<BattleActor> are within a shape range one by one, and deletes the virtual objects that are not in the range from the list. Other filters perform similar operations.

For example, a buffer-type filter deletes virtual objects that include a type of additional state such as an invisible state or an unselectable state.

For example, an identity filter (ID filter) deletes a virtual object that includes a skill identifier, and is used for processing to prevent a skill from hitting an enemy a second time.

For example, a can-kill filter is configured to determine whether a skill can defeat the virtual object. In addition to the foregoing filters, there are many other filters, and details are not described herein again.

Branch selector: A main function of the branch selector is to process a plurality of condition priorities. A plurality of selector IDs are configured in a configuration table. In the configuration function, a member variable selector set is initialized according to the configured selector IDs. In the selection function, the virtual objects in the parameter List<BattleActor> need to be temporarily stored, and the selection function is invoked with the temporarily stored List<BattleActor> as a parameter by using the base selectors in the selector set one by one, to determine whether BattleActor is returned. If BattleActor is returned, it indicates that one virtual object satisfies a target condition, for example, one virtual object is within a target search range or can be hit by a target skill, and the subsequent selector set does not need to be traversed. If BattleActor is not returned, a base selector in a next selector set can be traversed.

Priority selector: configured to sort the filtered List<BattleActor> to select an appropriate virtual object. A technician can configure hit conditions in a table, for example: health points take priority, a distance takes priority, a health point percentage takes priority, and in a distance to a focus point takes priority, and a terminal user selects the hit conditions. In the selection function, the parameter List<BattleActor> is sorted according to the configured hit conditions, and the first one in the list is returned. If the list is empty, NULL is returned.

Figure 10:
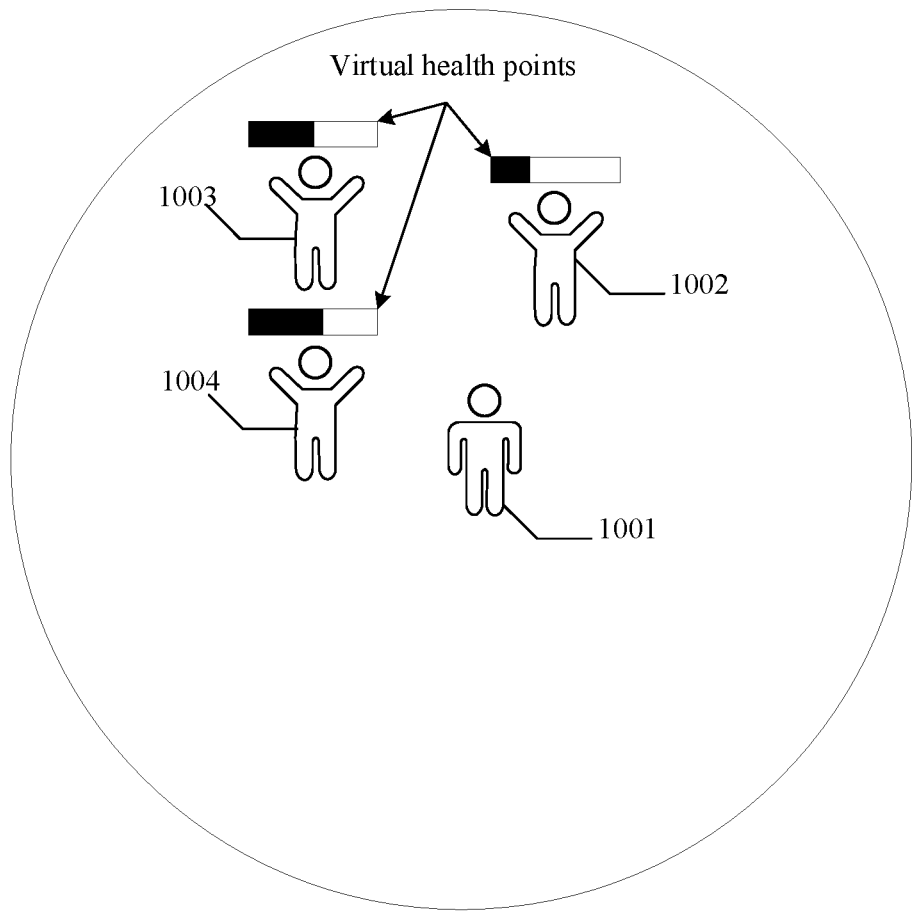
FIG. 10 is an exemplary schematic diagram of a game scene according to an embodiment of this disclosure.

Complex search logic can be implemented by combining a plurality of selectors, and a target virtual object that fulfills the intention of the terminal user is obtained. For example, FIG. 10 is a schematic diagram of a game scene according to an embodiment of this disclosure. As shown in FIG. 10, a controlled virtual object 1001, a first virtual object 1002, a first virtual object 1003, and a first virtual object 1004 are included. The first virtual object 1002 has the lowest current virtual health points but has relatively high magic resistance, that is, can reduce damage caused by a magic attack. The first virtual object 1003 and the first virtual object 1004 have relatively high current virtual health points but relatively low magic resistance. When a target skill triggered by the controlled virtual object 1001 is a magic attack skill, the first virtual object 1003 and the first virtual object 1004 can be defeated, but the first virtual object 1002 cannot be defeated.

Figure 11:
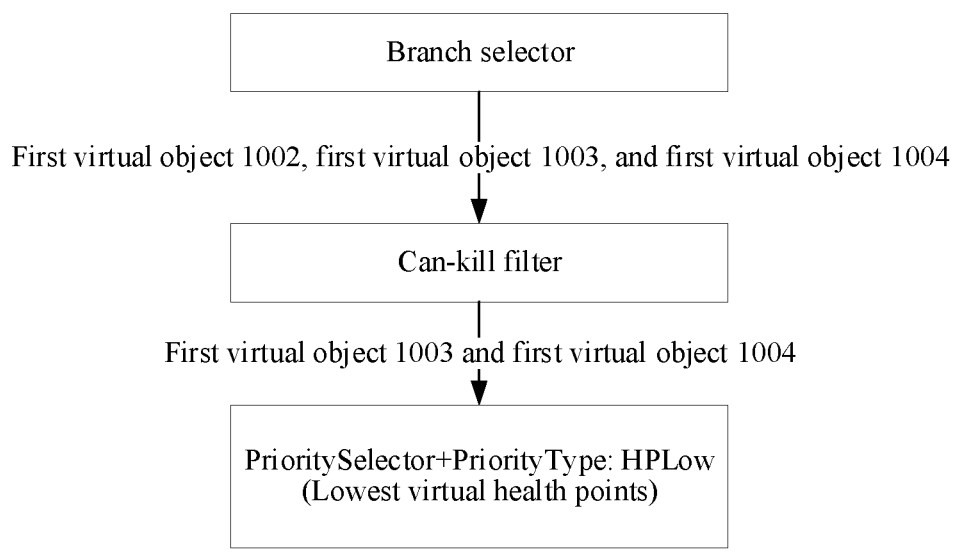
FIG. 11 is an exemplary schematic logic diagram of a search tree according to an embodiment of this disclosure.

The terminal user intends to defeat one of the first virtual objects through the target skill, and then logic of a search tree may be shown in FIG. 11. FIG. 11 is a schematic logic diagram of a search tree according to an embodiment of this disclosure. As shown in FIG. 11, three first virtual objects, namely, a first virtual object 1002, a first virtual object 1003, and a first virtual object 1004, are first determined by using a branch selector. Subsequently, the three first virtual objects are inputted to a can-kill filter to filter out the first virtual object that cannot be defeated by the target skill. Because the first virtual object 1002 cannot be defeated by the target skill, through the can-kill filter, the first virtual object 1003 and the first virtual object 1004 are obtained. Filtering is then performed through PrioritySelector+PriorityType: HPLow (the lowest virtual health points), that is, a target hit condition set by the terminal user: virtual health points take priority. Because current virtual health points of the first virtual object 1003 are less than current virtual health points of the first virtual object 1004, the first virtual object 1003 is returned as the target virtual object.

Simplified search logic is set for different virtual objects and different skills through the search tree, so that the terminal user can quickly and accurately select an intended virtual object through a relatively low operating cost, thereby improving the efficiency of human-computer interaction. Especially for some skills with special mechanisms, for example, skills that can be reused after a virtual object belonging to a hostile camp is defeated, in the method provided in the embodiments of this disclosure, a success rate of reusing the skills can be greatly increased and the efficiency of human-computer interaction is improved, thereby bringing better user experience to users and improving the playability of a game.

Figure 12:
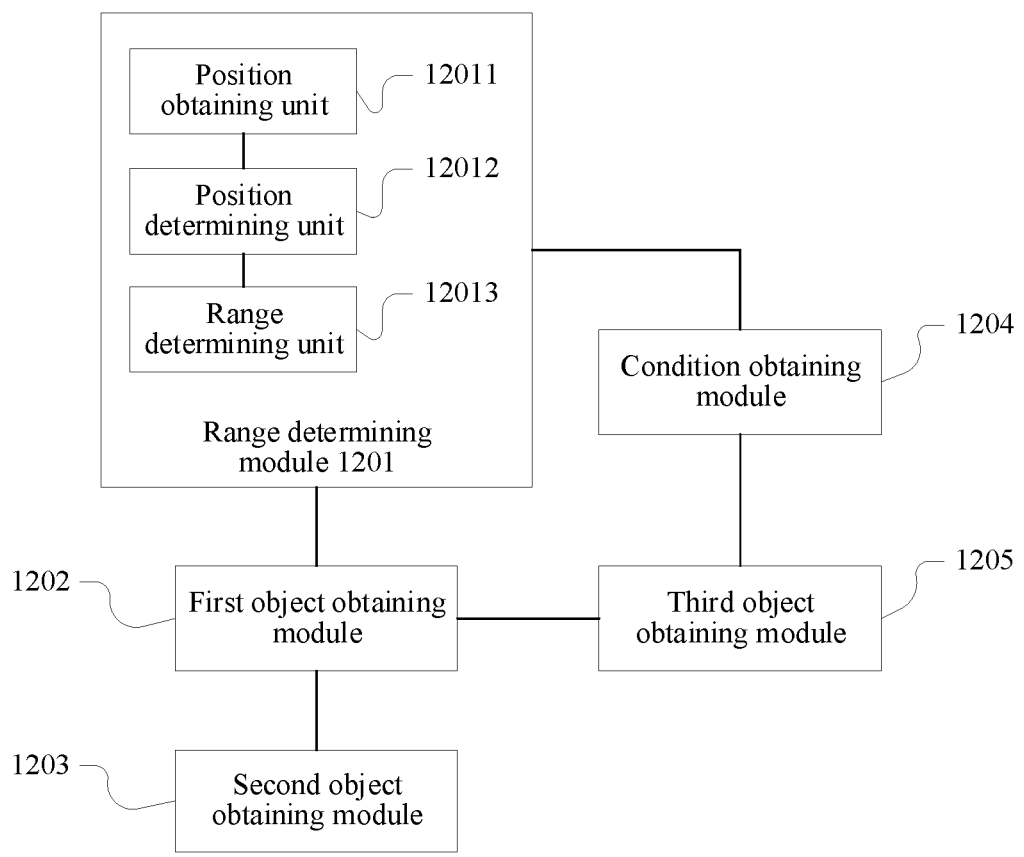
FIG. 12 is an exemplary schematic structural diagram of an apparatus for determining a target virtual object according to an embodiment of this disclosure.

FIG. 12 is an exemplary schematic structural diagram of an apparatus for determining a target virtual object according to an embodiment of this disclosure. Referring to FIG. 12, the apparatus includes a range determining module 1201, a first object obtaining module 1202, and a second object obtaining module 1203. One or more modules, submodules, and/or units of the apparatus can be implemented by processing circuitry, software, or a combination thereof, for example.

The range determining module 1201 is configured to determine a target search range corresponding to a target skill of a controlled virtual object in response to a trigger operation for the target skill, the controlled virtual object being a virtual object controlled by a terminal user.

The first object obtaining module 1202 is configured to obtain, in response to there being at least two first virtual objects in the target search range, at least one second virtual object that satisfies a defeated condition from the at least two first virtual objects, the first virtual object and the controlled virtual object belonging to different object sets, the defeated condition indicating whether virtual health points of the first virtual object reach a preset threshold after the target skill is performed on the first virtual object.

The second object obtaining module 1203 is configured to obtain, from the at least one second virtual object, a third virtual object that satisfies a target hit condition of the terminal user, the third virtual object being used as a target virtual object to be hit by the target skill.

In an implementation, the first object obtaining module 1202 is configured to perform the following processing on any one of the at least two first virtual objects: obtaining at least one damage type corresponding to the target skill; accumulating a damage value corresponding to the at least one damage type, to obtain a total damage value; and determining, in response to the total damage value being greater than current virtual health points of the first virtual object, the first virtual object as the second virtual object that satisfies the defeated condition.

In an implementation, the range determining module 1201 includes a position obtaining unit 12011, a position determining unit 12012, and a range determining unit 12013.

The position obtaining unit 12011 is configured to obtain a first screen position and a second screen position in response to a drag operation performed on a trigger option of the target skill, the first screen position being a start position, and the second screen position being an end position.

The position determining unit 12012 is configured to determine a first scene position corresponding to the target skill in a virtual scene according to the first screen position and the second screen position, the first scene position being a central position of the target search range.

The range determining unit 12013 is configured to determine the target search range corresponding to the target skill according to the first scene position, a second scene position of the controlled virtual object, and skill range information of the target skill, the skill range information including a skill casting range parameter and a skill search range parameter.

In an implementation, the position determining unit 12012 is configured to: determine first position information according to the first screen position, the second screen position, and a third screen position corresponding to a screen center, the first position information being used for indicating a direction of the first scene position relative to the second scene position; determine second position information according to the first screen position, the second screen position, drag range information of the trigger option of the target skill, and the skill range information of the target skill, the second position information being used for indicating a distance between the first scene position and the second scene position; and determine the first scene position according to the second scene position, the first position information, and the second position information.

In an implementation, the apparatus further includes a condition obtaining module 1204 and a third object obtaining module 1205.

The condition obtaining module 1204 is configured to obtain a target filtering condition corresponding to the target skill.

The third object obtaining module 1205 is configured to determine, from the target search range, a first virtual object that satisfies the target filtering condition.

In an implementation, the second object obtaining module 1203 is further configured to obtain, from the at least two first virtual objects in response to none of the at least two first virtual objects satisfying the defeated condition, the third virtual object that satisfies the target hit condition of the terminal user, the third virtual object being used as the target virtual object to be hit by the target skill.

In an implementation, the second object obtaining module 1203 is further configured to determine, in response to there being only one first virtual object in the target search range corresponding to the target skill, the first virtual object as the target virtual object.

In this embodiment of this disclosure, the at least one second virtual object that satisfies the defeated condition, that is, can be defeated by the target skill, is obtained from at least two first virtual objects obtained within a search range corresponding to the target skill, and then the target hit condition set by the terminal user is used for screening, so that the target virtual object determined by the terminal is consistent with a target virtual object intended by the terminal user, thereby improving the efficiency of human-computer interaction.

Figure 13:
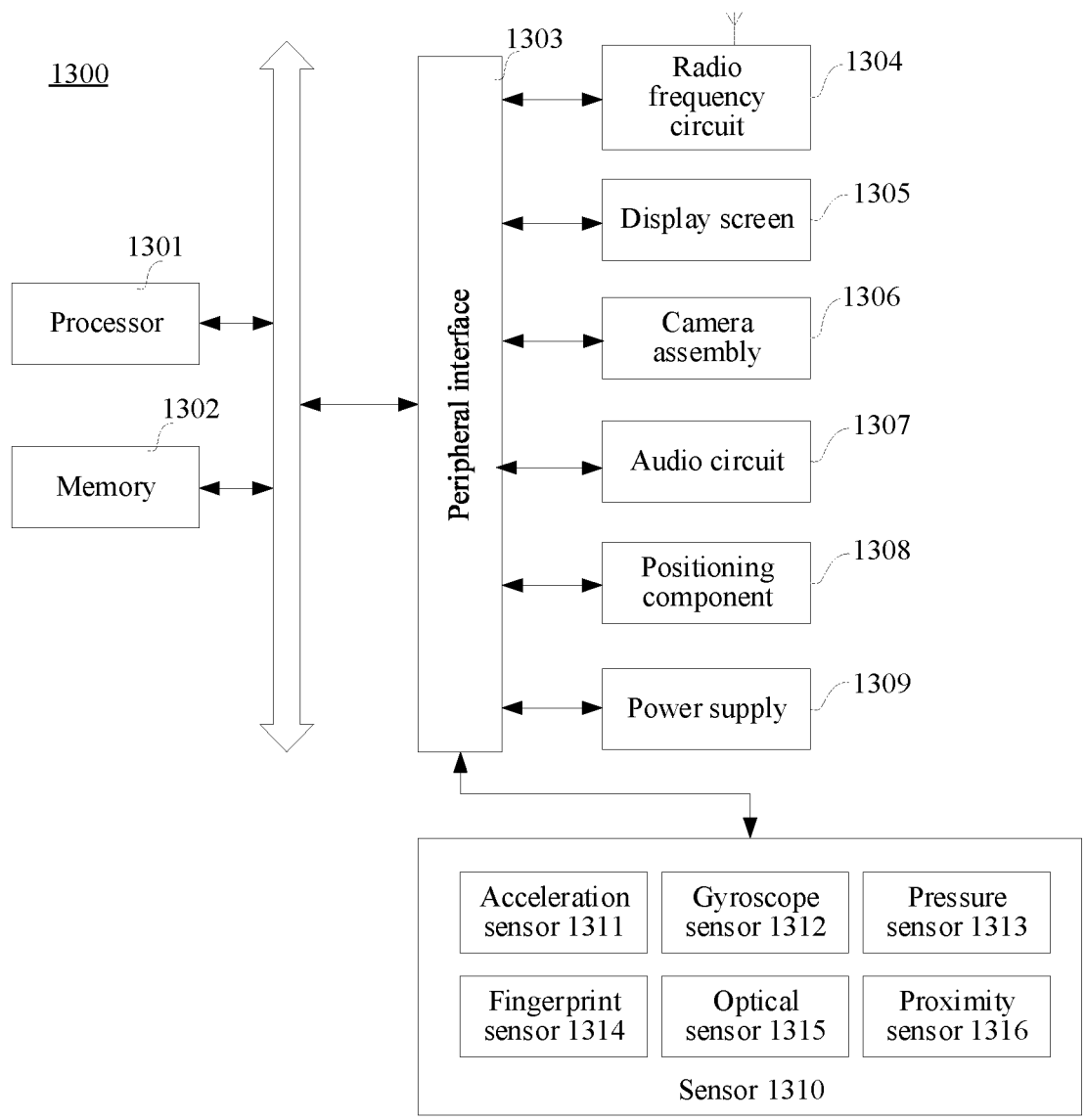
FIG. 13 is an exemplary schematic structural diagram of a terminal according to an embodiment of this disclosure.

FIG. 13 is a structural block diagram of a terminal 1300 according to an embodiment of this disclosure. The terminal 1300 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1300 may also be referred to other names such as user equipment, a portable terminal, a laptop terminal, or a desktop terminal.

Generally, the terminal 1300 includes processing circuitry, such as a processor 1301, and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1301 may be integrated with a graphics processing unit (GPU). The GPU is configured to be responsible for rendering and drawing content that a display screen needs to display. In some embodiments, the processor 1301 may further include an AI processor. The AI processor is configured to process a computing operation related to machine learning.

The memory 1302 may include one or more computer-readable storage medium. The computer-readable storage medium may be non-transient. The memory 1302 may further include a high-speed random access memory and a non-volatile memory, such as one or more magnetic disk storage devices or a flash storage device. In some embodiments, the non-transitory computer-readable storage medium in the memory 1302 is configured to store at least one instruction. The at least one instruction is executed by the processor 1301 to perform the method for determining a target virtual object provided in the method embodiment in this disclosure.

In some embodiments, the terminal 1300 may include a peripheral interface 1303 and at least one peripheral. The processor 1301, the memory 1302, and the peripheral interface 1303 may be connected by using a bus or a signal cable. Each peripheral may be connected to the peripheral interface 1303 by using a bus, a signal cable, or a circuit board. Specifically, the peripheral includes at least one of a radio frequency circuit 1304, a display screen 1305, a camera assembly 1306, an audio circuit 1307, a positioning component 1308, and a power supply 1309.

In some embodiments, the terminal 1300 may also include one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

A person skilled in the art may understand that the structure shown in FIG. 13 is merely exemplary and does not constitute a limitation on the terminal 1300, and the terminal may include more components or fewer components than those shown in the figure, or some components may be combined, or a different component deployment may be used.

An embodiment of this disclosure further provides a computer-readable storage medium. The computer-readable storage medium is applied to a terminal and includes a memory of at least one piece of program code, the at least one piece of program code being executed by a processor in the terminal to complete the method for determining a target virtual object in the foregoing embodiments. For example, the computer-readable storage medium may include a non-transitory computer-readable storage medium such as a read-only memory (ROM), a random access memory (RAM), a compact disc read-only memory (CD-ROM), a magnetic tape, a floppy disk, an optical data storage device, or the like.

An embodiment of this disclosure further provides an application program product, storing one or more instructions, the one or more instructions being executed by a processor of a computer device to implement the method for determining a target virtual object.

A person of ordinary skill in the art may understand that all or some of the steps of the foregoing embodiments may be implemented by hardware, or may be implemented a program instructing related hardware. The program may be stored in a computer-readable storage medium. The storage medium may be a non-transitory computer-readable storage medium such as a ROM, a magnetic disk, or an optical disc.

The foregoing descriptions are merely exemplary embodiments of this disclosure, and are not intended to limit the scope of this disclosure. Any modification, equivalent replacement, or improvement made within the spirit and principle of this disclosure shall fall within the protection scope of this disclosure.

What is claimed is:

1. A method for determining a target virtual object, the method comprising:
   determining a target search range corresponding to a target skill of a controlled virtual object in response to a trigger operation of the target skill, the virtual object being controlled by a user;
   obtaining, in response to the target search range including a plurality of first virtual objects in the target search range, at least one second virtual object that satisfies a defeated condition from the plurality of first virtual objects in the target search range, the defeated condition indicating that a preset threshold of virtual health points will be reached after the target skill is performed on the first virtual object; and
   obtaining, from the at least one second virtual object in the target search range by processing circuitry, a third virtual object that satisfies a target hit condition of the user, the target skill being performed on the third virtual object as the target virtual object.

2. The method according to claim 1, wherein the obtaining the at least one second virtual object comprises:
   obtaining at least one damage type corresponding to the target skill;
   accumulating a damage value corresponding to the at least one damage type, to obtain a total damage value; and
   determining, in response to the total damage value being greater than current virtual health points of a first virtual object of the plurality of first virtual objects, the first virtual object as the second virtual object that satisfies the defeated condition.

3. The method according to claim 1, wherein the determining the target search range comprises:
   obtaining a first screen position and a second screen position in response to a drag operation performed on a trigger function of the target skill, the first screen position being a start position, and the second screen position being an end position;
   determining a first scene position corresponding to the target skill in a virtual scene according to the first screen position and the second screen position, the first scene position being a central position of the target search range; and
   determining the target search range according to the first scene position, a second scene position of the controlled virtual object, and skill range information of the target skill, the skill range information indicating a skill casting range and a skill search range.

4. The method according to claim 3, wherein the determining the first scene position comprises:
   determining first position information according to the first screen position, the second screen position, and a third screen position corresponding to a screen center, the first position information indicating a direction of the first scene position relative to the second scene position;
   determining second position information according to the first screen position, the second screen position, drag range information of the trigger function of the target skill, and the skill range information of the target skill, the second position information indicating a distance between the first scene position and the second scene position; and
   determining the first scene position according to the second scene position, the first position information, and the second position information.

5. The method according to claim 3, wherein after the determining the target search range, the method further comprises:
   obtaining a target filtering condition corresponding to the target skill; and
   determining, from the target search range, a first virtual object of the plurality of first virtual objects that satisfies the target filtering condition.

6. The method according to claim 1, wherein before the obtaining the at least one second virtual object, the method further comprises:
   obtaining, from the plurality of first virtual objects in response to none of the plurality of first virtual objects satisfying the defeated condition, the third virtual object that satisfies the target hit condition of the user, the target skill being performed on the third virtual object.

7. The method according to claim 1, wherein after the determining the target search range, the method further comprises:
   determining, in response to the target search range only covering one first virtual object, the one first virtual object as the target virtual object.

8. An apparatus, comprising:
   processing circuitry configured to:
      determine a target search range corresponding to a target skill of a controlled virtual object in response to a trigger operation of the target skill, the virtual object being controlled by a user;
      obtain, in response to the target search range including a plurality of first virtual objects in the target search range, at least one second virtual object that satisfies a defeated condition from the plurality of first virtual objects in the target search range, the defeated condition indicating that a preset threshold of virtual health points will be reached after the target skill is performed on the first virtual object; and
      obtain, from the at least one second virtual object in the target search range, a third virtual object that satisfies a target hit condition of the user, the target skill being performed on the third virtual object as a target virtual object.

9. The apparatus according to claim 8, wherein the processing circuitry is configured to:
   obtain at least one damage type corresponding to the target skill;
   accumulate a damage value corresponding to the at least one damage type, to obtain a total damage value; and determine, in response to the total damage value being greater than current virtual health points of a first virtual object of the plurality of first virtual objects, the first virtual object as the second virtual object that satisfies the defeated condition.

10. The apparatus according to claim 8, wherein the processing circuitry is configured to:
obtain a first screen position and a second screen position in response to a drag operation performed on a trigger function of the target skill, the first screen position being a start position, and the second screen position being an end position;
determine a first scene position corresponding to the target skill in a virtual scene according to the first screen position and the second screen position, the first scene position being a central position of the target search range; and
determine the target search range according to the first scene position, a second scene position of the controlled virtual object, and skill range information of the target skill, the skill range information indicating a skill casting range and a skill search range.

11. The apparatus according to claim 10, wherein the processing circuitry is configured to:
determine first position information according to the first screen position, the second screen position, and a third screen position corresponding to a screen center, the first position information indicating a direction of the first scene position relative to the second scene position;
determine second position information according to the first screen position, the second screen position, drag range information of the trigger function of the target skill, and the skill range information of the target skill, the second position information indicating a distance between the first scene position and the second scene position; and
determine the first scene position according to the second scene position, the first position information, and the second position information.

12. The apparatus according to claim 10, wherein the processing circuitry is configured to:
after the target search range is determined,
obtain a target filtering condition corresponding to the target skill; and
determine, from the target search range, a first virtual object of the plurality of first virtual objects that satisfies the target filtering condition.

13. The apparatus according to claim 8, wherein the processing circuitry is configured to:
before the at least one second virtual object is obtained, obtain, from the plurality of first virtual objects in response to none of the plurality of first virtual objects satisfying the defeated condition, the third virtual object that satisfies the target hit condition of the user, the target skill being performed on the third virtual object.

14. The apparatus according to claim 8, wherein the processing circuitry is configured to:
after the target search range is determined, determine, in response to is the target search range only covering one first virtual object, the one first virtual object as the target virtual object.

15. A terminal, comprising one or more processors and one or more memories, the one or more memories storing at least one piece of program code, the at least one piece of program code being loaded and executed by the one or more processors to perform the method according to claim 1.

16. A non-transitory computer-readable storage medium, storing instructions which when executed by a processor cause the processor to perform:
determining a target search range corresponding to a target skill of a controlled virtual object in response to a trigger operation of the target skill, the virtual object being controlled by a user;
obtaining, in response to the target search range including a plurality of first virtual objects in the target search range, at least one second virtual object that satisfies a defeated condition from the plurality of first virtual objects in the target search range, the defeated condition indicating that a preset threshold of virtual health points will be reached after the target skill is performed on the first virtual object; and
obtaining, from the at least one second virtual object in the target search range, a third virtual object that satisfies a target hit condition of the user, the target skill being performed on the third virtual object as a target virtual object.

17. The non-transitory computer-readable storage medium according to claim 16, wherein the obtaining the at least one second virtual object comprises:
obtaining at least one damage type corresponding to the target skill;
accumulating a damage value corresponding to the at least one damage type, to obtain a total damage value; and
determining, in response to the total damage value being greater than current virtual health points of a first virtual object of the plurality of first virtual objects, the first virtual object as the second virtual object that satisfies the defeated condition.

18. The non-transitory computer-readable storage medium according to claim 16, wherein the determining the target search range comprises:
obtaining a first screen position and a second screen position in response to a drag operation performed on a trigger function of the target skill, the first screen position being a start position, and the second screen position being an end position;
determining a first scene position corresponding to the target skill in a virtual scene according to the first screen position and the second screen position, the first scene position being a central position of the target search range; and
determining the target search range according to the first scene position, a second scene position of the controlled virtual object, and skill range information of the target skill, the skill range information indicating a skill casting range and a skill search range.

19. The non-transitory computer-readable storage medium according to claim 18, wherein the determining the first scene position comprises:
determining first position information according to the first screen position, the second screen position, and a third screen position corresponding to a screen center, the first position information indicating a direction of the first scene position relative to the second scene position;
determining second position information according to the first screen position, the second screen position, drag range information of the trigger function of the target skill, and the skill range information of the target skill, the second position information indicating a distance between the first scene position and the second scene position; and determining the first scene position according to the second scene position, the first position information, and the second position information.

20. The non-transitory computer-readable storage medium according to claim 18, wherein after the determining the target search range, the instructions which when executed by the processor cause the processor to perform:
obtaining a target filtering condition corresponding to the target skill; and
determining, from the target search range, a first virtual object of the plurality of first virtual objects that satisfies the target filtering condition.

\* \* \* \* \*